April 14, 1942.  M. A. WECKERLY  2,279,698
CLOSURE TESTING DEVICE
Filed Dec. 15, 1939  5 Sheets-Sheet 1
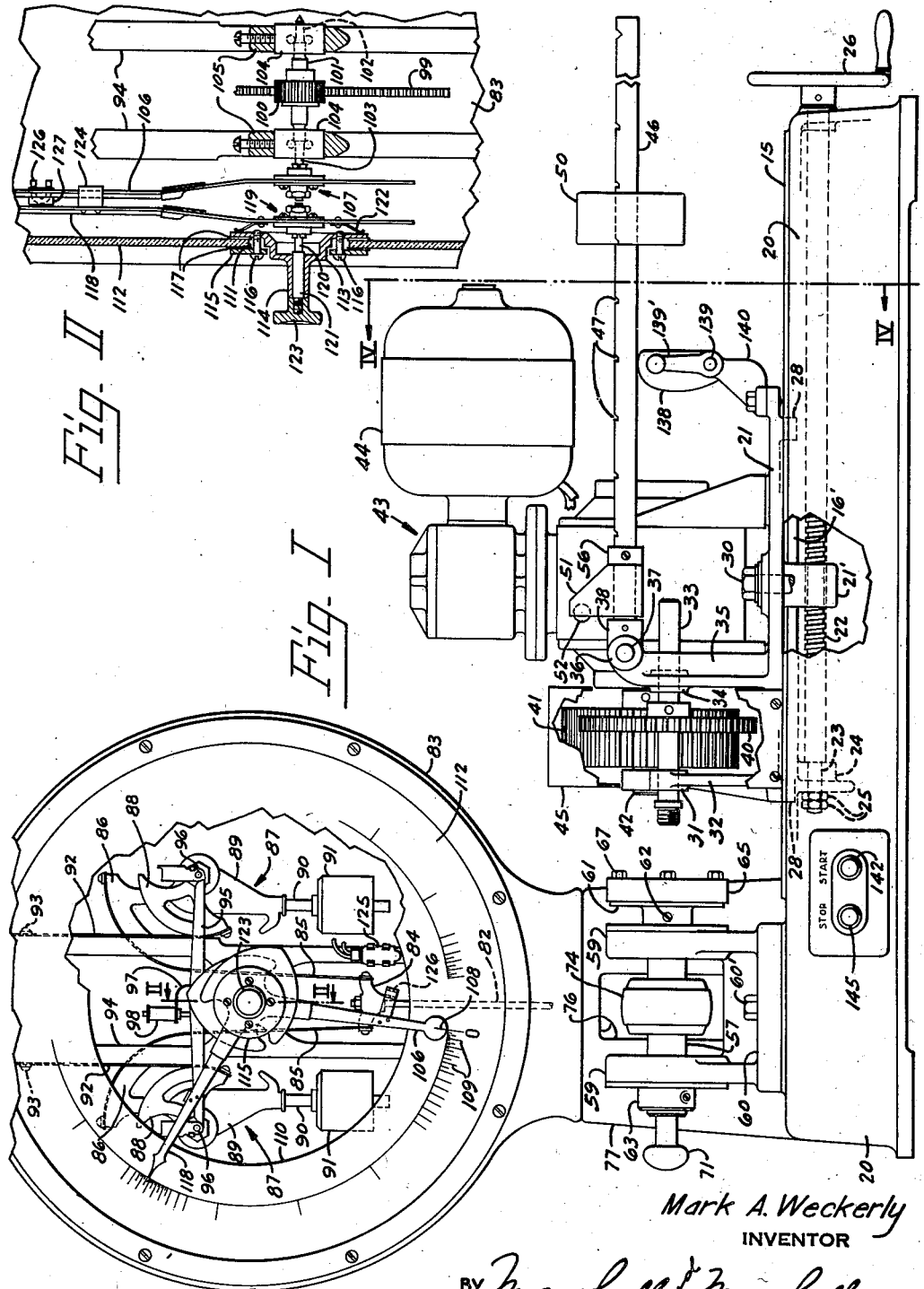
Mark A. Weckerly
INVENTOR
BY Marshall & Marshall
ATTORNEYS April 14, 1942.     M. A. WECKERLY     2,279,698
CLOSURE TESTING DEVICE
Filed Dec. 15, 1939     5 Sheets-Sheet 2
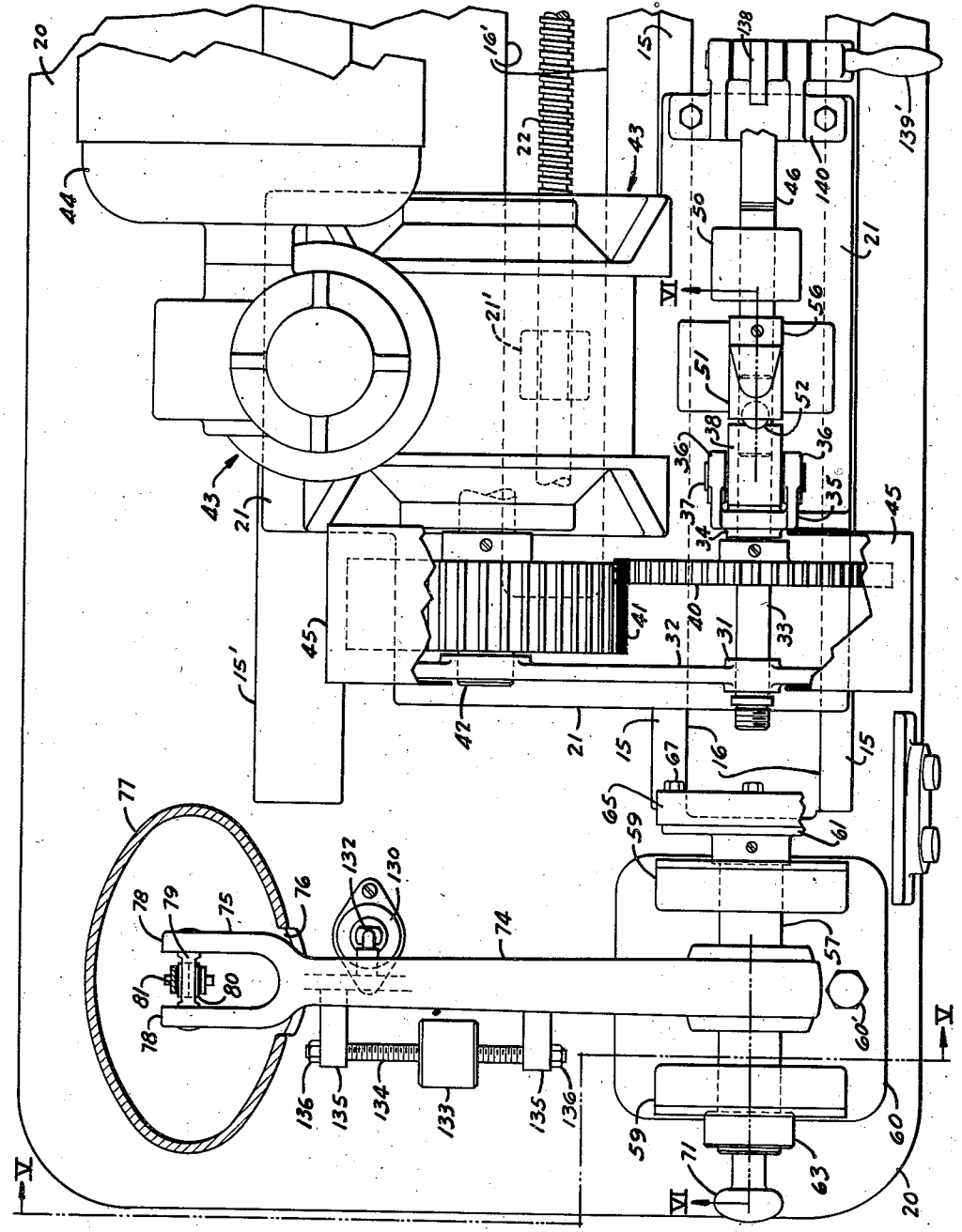
Fig. III
Mark A. Weckerly
INVENTOR
BY Marshall & Marshall
ATTORNEYS April 14, 1942.   M. A. WECKERLY   2,279,698
CLOSURE TESTING DEVICE
Filed Dec. 15, 1939   5 Sheets-Sheet 3
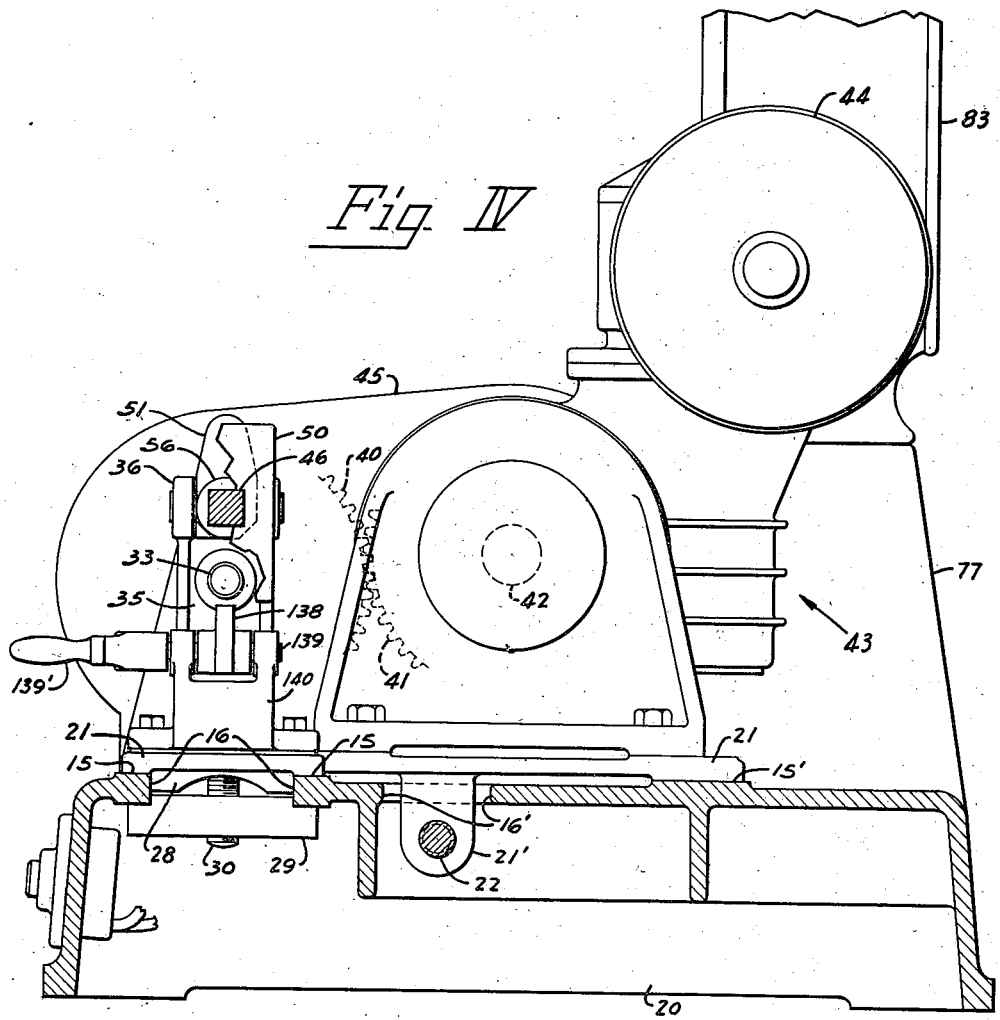
Fig. IV
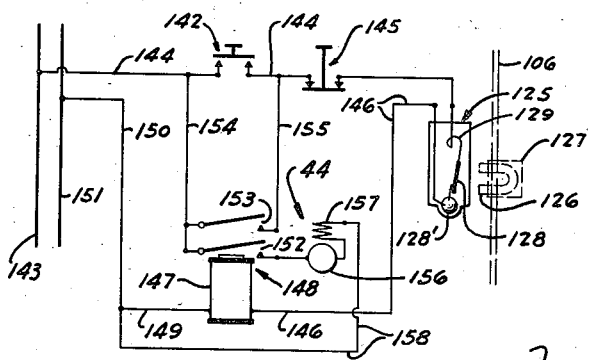
Fig. VII
Mark A. Weckerly
INVENTOR
BY Marshall & Marshall
ATTORNEYS

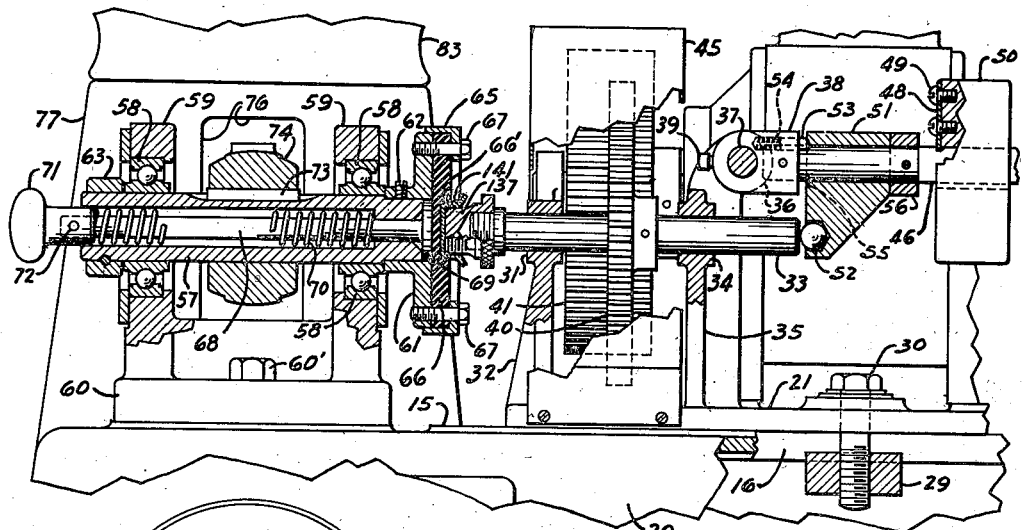

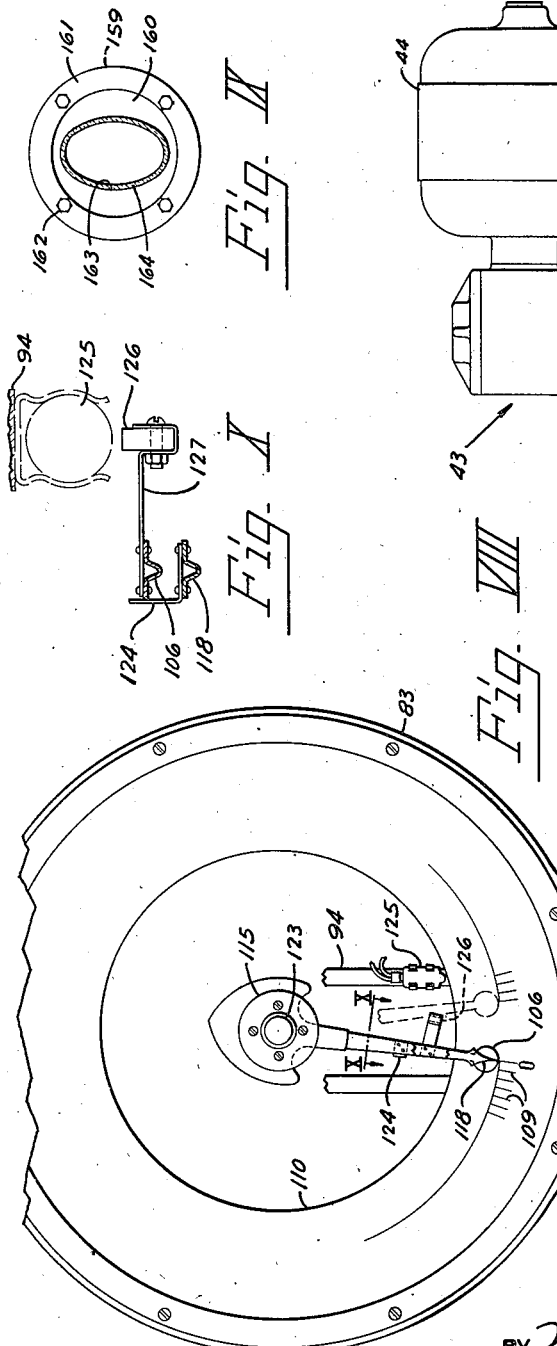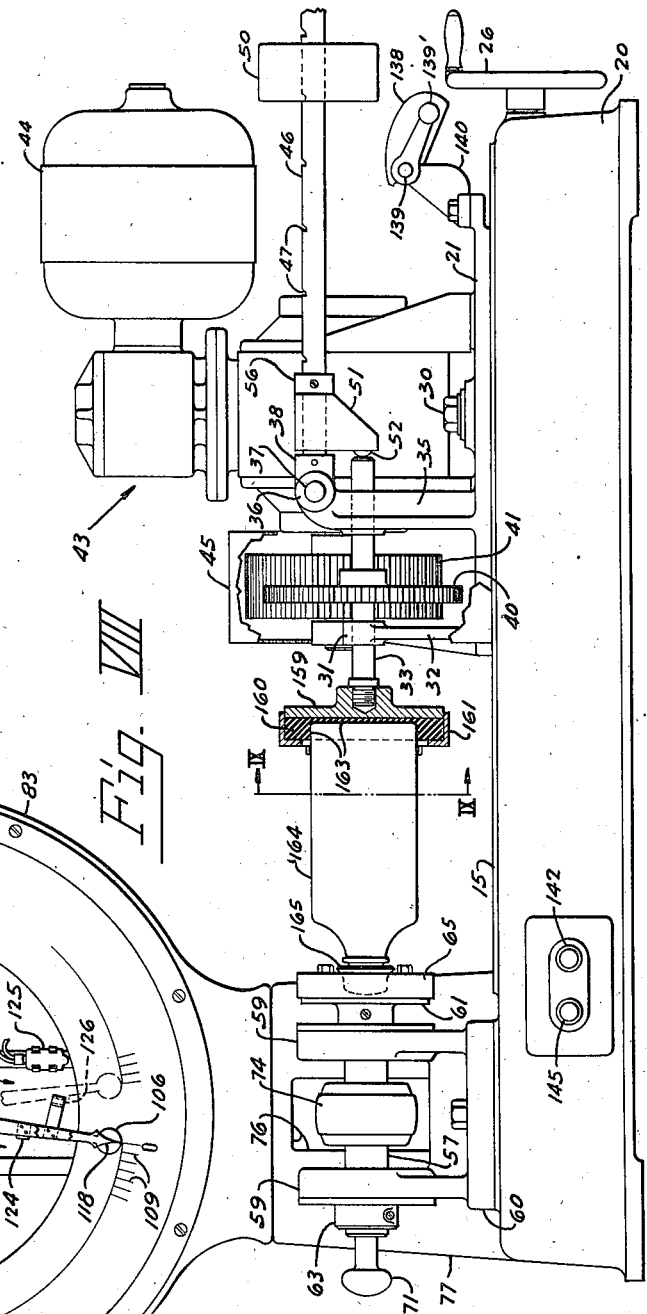

Patented Apr. 14, 1942

2,279,698

UNITED STATES PATENT OFFICE 2,279,698

CLOSURE TESTING DEVICE

Mark A. Weckerly, Toledo, Ohio, assignor to Toledo Scale Company, Toledo, Ohio, a corporation of New Jersey Application December 15, 1939, Serial No. 309,310

6 Claims. (Cl. 265—17)

This invention relates generally to closure testing devices, and more particularly to devices for testing the mechanical strength of screw caps molded from synthetic resins and used as closures for bottles or other receptacles and for testing the assembled receptacles and caps.

Devices for determining the strength of bottle caps are known. In such devices, however, the testing force is manually applied by a screw and handwheel, or similar means. Such application of force is neither steady nor continuous and is very apt to lead to erroneous data.

The principal object of the invention is the provision of a compact and simple device for automatically ascertaining the mechanical strength of molded bottle caps.

Another object is the provision of improved means for obtaining numerical values of the strength of molded bottle caps.

Another object is the provision of improved means in a testing device for applying a steady, continuous testing torque by means of an electric motor.

Another object is the provision of an improved device for testing bottle caps which is adapted to duplicate forces encountered in filling and capping machines; and, Still another object is the provision of improved means in a device of the class described for determining the permissible torque which may be applied to an assembled bottle and cap by the capping spindle of a filling machine.

These, and other objects and advantages will be apparent from the following description in which reference is had to the accompanying drawings, illustrating a preferred embodiment of the invention and wherein similar reference numerals refer to similar parts throughout the several views.

Referring to the drawings:

Fig. I is a front elevational view of the device, portions of housing members being broken away to more clearly show the mechanism.

Fig. II is an enlarged fragmentary sectional side elevational view of the indicating means of the automatic force counterbalancing mechanism, the section being taken substantially along the line II—II of Fig. I.

Fig. III is an enlarged fragmentary plan view, parts being broken away and others sectioned.

Fig. IV is an enlarged sectional end elevational view of the device, the section being taken along the line IV—IV of Fig. I.

Fig. V is an enlarged elevational view of the other end of the device, parts being sectioned as indicated by the line V—V of Fig. III and other parts being broken away, the view showing particularly the torque lever of the device.

Fig. VI is an enlarged sectional front elevational view, the section being along the line VI—VI of Fig. III.

Fig. VII is a diagram of the electrical circuits.

Fig. VIII is a front elevational view of the device as modified for testing strength of assembled bottles and caps.

Fig. IX is an end elevational view of the bottle retaining chuck substantially as seen from along the line IX—IX of Fig. VIII; and, Fig. X is an enlarged section through the indicators of the automatic force counterbalancing mechanism, the section being along the line X—X of Fig. VIII.

Referring to the drawings in detail:

Mounted upon machined pads 15 which extend adjacent the machined edges of an elongated slot 16 and a machined pad 15' in spaced relation to the pads 15 and parallel thereto, on a substantially rectangular, hollow base 20, is a slide 21. Substantially midway between the outer pad 15 and the pad 15' the base is provided with another slot 16' through which an integral boss 21', depending from the slide 21, extends into the hollow interior of the base 20 and through a horizontal aperture in this boss a screw shaft 22 is threaded. The rear end of this screw shaft is rotatably mounted by means of a turned-down shoulder 23 in a boss 24 which is an integral portion depending from the underside of the face of the base.

Lock nuts 25, threaded on a portion of the turned-down shoulder 23 extending through the boss 24, serve to prevent longitudinal displacement of the screw shaft 22. The opposite end of this shaft projects freely through the substantially vertical end wall of the base and a handwheel 26 is mounted thereon so that the shaft may be rotated and move the slide 21 back and forth on the machined pads.

The movement of the slide 21 is guided by two elongated, parallelly extending bosses 28, which depend from its underside and are machined to engage the machined edges of the slot 16 into which they project. Means are also provided to lock the slide, in any desired position, on the machined pads 15 and 15'. These means comprise a clamping bar 29 having machined shoulders which enter the slot 16 from below and a bolt 30, which extends through an apertured boss on the upper face of the slide 21 and whose other end is threaded through the clamping bar 29.

Extending through a boss 31, which is located adjacent the upper edge of a flange 32 arising adjacent the inner edge of the slide 21 (Fig. VI), is a shaft 33. The other end of this shaft projects through an aperture in a boss 34 on the face of a riser 35 which is integral with the slide 21. The upper end of this riser is bifurcated forming two slightly offset arms 36. Apertures in these arms form bearings for a short shaft 37 which extends laterally through a thrust arm hinge block 38. A set screw 39, threaded through one end of the block 38, serves to lock the shaft 37 therein. The shaft 33, which is freely mounted in the bearings formed by the apertures in the flange 32 and the riser 35 so that it can rotate and be shifted longitudinally, has locked thereon a narrow faced gear 40. The teeth of this gear engage teeth of a gear 41 which has a comparatively wide face so that when the shaft 33 is shifted longitudinally the teeth of the gears 40 and 41 will not become disengaged. The gear 41 is keyed to the output shaft 42 of a double reduction speed reduction unit 43 which is bolted to the slide 21. The armature shaft of a small electric motor 44, mounted upon this reduction unit, is directly coupled to the input shaft of this reduction unit.

To prevent injuries to the operator or to the device itself which may be occasioned by carelessness a sheet metal cover 45 is provided to house the gears 40 and 41.

It is an object of this invention in testing bottle caps or the assembled bottle and cap to duplicate the forces encountered in filling and capping machines as closely as possible. To partially accomplish this, there is studded into the hinge block 38 and pinned therein, a thrust torque arm 46 which in this embodiment is a rectangular steel rod provided with a series of notches 47. These notches are spaced along the upper edge of the rod and serve to receive the lower edge of a small hardened steel plate 48 fastened, by means of screws 49, to a poise 50, which is slidably mounted on the thrust arm 46 so that its moment may vary the amount of end thrust imparted to the shaft 33 through a thrust knuckle 51 (Fig. VI). This thrust torque duplicates the force exerted by the capping spindle of the filling machine. The thrust knuckle is rotatably mounted upon the arm 46 immediately adjacent the hinge block 38 and held against longitudinal movement by a collar 56 pinned to the arm 46. It is provided with a steel ball 52, staked in the face of its free end so that a portion projects beyond this face and this projecting portion is adapted to contact the end of the shaft 33 to transmit the moment of the poise 50.

To selectively hold the knuckle 51 in or out of engagement with the end of the shaft 33, a plunger 53, seated in a small bore in the hinge block and influenced by a compression spring 54, under the urge of this spring, is adapted to enter one or the other of a pair of shallow conical cavities 55 suitably spaced in the face of this knuckle.

In longitudinal alignment with the shaft 33 is a hollow shaft 57 mounted in a pair of ball bearings 58, each of which is situated in an upwardly extending arm 59 of a bifurcated bearing bracket 60 secured by means of bolts 60' to the base 20. Endwise movement of this hollow shaft is prevented by the hub of an annular face plate 61 which is mounted on one end of this shaft and locked thereto by a set screw 62 and a collar 63 pinned to the opposite end of this shaft. The machined face of the hub of the face plate 61 engages the inner race of one of the ball bearings 58 and the collar 63 on the opposite end engages the inner race of the other bearing. Fastened to the face plate 61 which extends a short distance beyond the end of the shaft 57, by means of a collar 65, is a relatively thick disk 66 of flexible rubber which is adapted to perform the functions of a chuck to hold the caps while being tested. The collar 65, which retains this chuck, is bolted to the face plate by means of a plurality of small bolts 67 which pass through aligned apertures in this collar and chuck and which are threaded into the face plate 61.

Means are provided to manipulate the chuck 66 so that a circular cavity 66' cored therein is conditioned to firmly grip a bottle cap and cooperate to transmit the applied torque to counterbalancing mechanism and indicating means which will later be more particularly described. These means include a plunger 68 positioned in the hollow interior of the shaft 57. This plunger has a head 69 which, when the plunger is in its normal position, occupies the space between the end of the shaft and the inner surface of the chuck 66 and immediately in back of the cavity 66' in the opposite face of this chuck. The head 69 of the plunger is normally held against the end of the shaft by the bias of a compression spring 70 which is circumjacently mounted thereon between a shoulder in the interior of the shaft and the hub of a finger knob 71, locked to the shaft by means of a pin 72.

Cooperating with the chuck 66 to transmit the torque is a torque lever 74 having one of its ends keyed to the shaft 57, by means of a key 73, midway between the upstanding arms 59 of the bracket 60 (Figures III and VI), whose other end 75 enters through an opening 76 into the interior of a short hollow column 77 rising upwardly from the base 15. The end 75 is bifurcated and arms 78 formed thereby support the end of a knife edge pivot 79. This knife edge pivot engages a suitable bearing 80 in a stirrup 81 which is suspended from the lower end of a connecting rod 82 which extends vertically upwards into the interior of a substantially watchcase-shaped housing 83 surmounting the upper end of the column 77. The opposite or upper end of this rod is locked in an equalizing yoke 84 clamped to the lower ends of flexible metallic ribbons 85 whose upper ends overlie and are fastened to the arcuate faces of power sectors 86, each of which being a component member of a force counterbalancing pendulum 87. Each of the pendulums 87, in addition to the power sectors, is provided with two fulcrum sectors 88, one of which being stationed on each side of the power sector on a shaft extending through hubs of the sectors. A pendulum body 89, adjustably clamped to the power sector, has studded therein a depending stem 90 on which a pendulum weight 91 is adjustably threaded.

Each pendulum 87 is suspended by means of flexible metallic ribbons 92 whose lower ends overlie and are clamped to the lower end of the arcuate faces of the fulcrum sectors and whose upper ends are clamped at 93 to vertically extending machined faces of a pendulum frame 94 which is bolted, in suitable position, in the interior of the housing 83.

To translate the reciprocatory motion of the pendulums into rotation of the indicating means the ends of horizontally extending plates 95 pivotally engage the ends of the shafts as indicated at 96, which extend through the sector hubs. Pivotally connecting the plates 95 is a bar (not shown) and secured to this bar is a C-shaped member 97 having a member 98 which adjustably retains the upper end of a depending rack 99 (Fig. II). The construction of the plates 95 and their connection through the C-shaped member to the rack is illustrated and described in detail in U. S. Patent No. 1,285,141. The teeth of the rack 99 engage the teeth of a pinion 100 which is fixedly mounted on an indicator shaft 101. This shaft is provided with tenons 102 and 103 which rest in ball bearings 104 seated in laterally extending flanges 105 of the pendulum frame 94.

The tenon 103 of the indicator shaft 101 extends a substantial distance beyond the ball bearing 104 and to this extending end an indicator 106 is clamped by means of an indicator hub 107 in the usual manner. This indicator is provided with an index 108 which cooperates with a series of radial weight graduations 109 printed on a chart 110, fixedly stationed in the interior of the housing 83 immediately in back of the indicator 106.

Seated in a centrally located aperture 111 in a circular pane of glass 112 (Fig. II), which covers the open face of the housing 83, is a bracket 113 having an outwardly directed tubular extension 114. The bracket 113 is clamped to the glass surrounding the opening 111, with the cooperation of an integral flange, by a collar 115 and screws 116 which pass freely through this plate and are threaded into the flange, there being thin washers 117, made from a resilient material, interposed between the glass and the collar and between the glass and the flange of the bracket 113 to prevent movement of the bracket 113 without exerting excessive clamping pressure.

An auxiliary, a so-called "set" indicator 118 is clamped, by means of a hub 119, to a tenon 120 of a shaft 121. The shaft 121 which is rotatively mounted in the tubular extension 114 of the bracket 113 extends into the interior of the housing 83. A plurality of small formed plate springs 122, which are riveted to the indicator 118 and engage the inner face of the flange of the bracket 113, serve to draw inwardly the hub of a finger knob 123 secured to an exteriorly extending portion of the shaft 121 and thus press the machined face of the hub against the end of the tubular extension 114. These springs 122 exert slight, but sufficient, frictional resistance to cause the indicator 118 to remain in any position when the force, which causes the rotation, has ceased.

A "set" indicator of this type, in testing machines, is actuated by the indicator which is directly actuated by the mechanism, and carried to the position indicating the maximum force applied. These indicators are then released and they remain "set" in this position when, due to the rupture of the test specimen, the mechanism returns its indicator to the zero position. In the present invention, the set indicator 118 has riveted to it a small angle clip 124 (Fig. X), a leg of which extends into the path of the indicator 106 so that when, due to the application of a force, the indicator 106 moves it carries the indicator 118 with it. Therefore, the small formed plate springs 122 in the embodiment of this invention must be so designed to cause only such small amount of friction as is necessary to hold the indicator 118 in position when the indicator 106 returns to zero.

In testing devices which have an automatically actuated indication it is always an object, for the sake of accuracy, to provide capacity that is only slightly greater than the maximum force required for performing the operation so that the spaces between the graduations of the chart are as wide as possible. It sometimes happens that a test specimen requires a force in excess of the capacity of the device to rupture it; then, the force counterbalancing mechanism, in this case the pendulums 87, will be carried beyond their normal end position and injury to the device may result. To prevent this, a mercury magnetic switch 125 is adjustably fixed to the pendulum frame 94 in a position so that a small horseshoe or other magnet 126 (Figs. VIII and X) clamped to an arm 127, which in turn is riveted to the indicator 106, is adapted to open a circuit by drawing an armature 128 out of engagement with a mercury globule 128' in which it is normally held by the bias of a spring 129 and thus de-energize the motor 44 when the index 108 of the indicator 106 passes the final or full capacity graduation of the series 109 on the chart 110.

For the usual purpose, a dashpot 130 is positioned in the base 20 and its plunger 131 is pivotally connected to an arm 132 extending laterally from the torque lever 74, in which it is adjustable.

So that the "initial pull" of the torque lever 74 on the counterbalancing mechanism, to which it is pivotally connected, can be properly adjusted a balance weight 133 is threaded upon a rod 134 extending between two arms 135 which project laterally from the lever 74. Nuts 136 serve to hold the rod 134 in place.

In conditioning the device for use, the operator first loosens the clamping bolt 30 and moves the slide 21 into a position, which depends upon the kind and size of cap to be tested, and assembles a fixture 137 (Fig. VI), which is internally threaded, to the threaded end of the shaft 33.

The thrust knuckle 51 on the thrust torque arm 46, which, at this time, is being supported upon a cam 138 pivoted by a shaft 139 in a bracket 140 that is bolted to the slide 21, is in its upper position as shown in Fig. I, the poise 50 is positioned by that notch 47 of the series on the arm 46 in which its moment exerts the required end thrust on the shaft 33. The operator now presses against the finger knob 71, which extends towards the left of the hollow shaft 57 in the bracket 60 against the bias of the spring 70 and the head 69, and forces the rubber chuck 66 to flex away from the face plate 61. When the chuck 66 is flexed the upper portion of the walls of the cavity 66' are expanded to a greater extent than the lower portion and the normally straight cavity becomes conical. The operator now places a cap 141, which is to be tested, into this conical cavity with its open end towards the fixture 137 and then releases a pressure on the finger knob 71. The chuck 66 resumes its normal position and the wall of the cavity tightly grips the periphery of the cap 141. The knuckle 51 is now turned to its lower position (as shown in Fig. VI) and by turning the handle 139' to the right which moves the cam 138 away from the torque arm 46 (Fig. VIII) and its moment, transmitted through the knuckle 51, moves the shaft 33 so that the external thread on the fixture 137 comes into engagement with the first thread in the interior of the bottle cap.

Pressure on a normally open push button switch 142 (Fig. VII) closes a circuit from a power lead 143, over lead 144, normally closed push button switch 145, the normally closed contact formed by the armature 128 and the mercury globule 128', lead 146 through a coil 147 of a relay 148, leads 149 and 150 to the other power lead 151. This energizes the coil 147 and draws in the normally open contacts 152 and 153. Closing of the normally open contact 153 seals the circuit when pressure is released from the push button 142 and its contacts open. The current is now carried around this push button through lead 154, the contact 153 and lead 155. When the contact 152 is closed by the energization of the coil 147 current flows from the power lead 143 through lead 144, lead 154, contact 152, armature 156 of the motor 44, field coil 157 of this motor and through leads 158 and 150 to the other power lead 151. The motor is thus energized and through the double reduction speed reducer 43 the broad-faced gear 41 is caused to rotate in an anticlockwise direction and since its teeth engage the teeth of the gear 40 fastened to the shaft 33 this gear and shaft is caused to rotate in a clockwise direction. The external thread of the fixture 137 now enters the internal thread of the cap 141 held in the chuck 66 and the shaft 33 is thus pulled outwardly by the cooperation of these threads, the gear 40 sliding along the broad face of the gear 41 until the end of the fixture 137 contacts the bottom of the screw cap 141. Further rotation of the shaft 33 now causes a torque to be set up by the hollow shaft 57 which through the torque lever 74 is transmitted through the pivot 79, stirrup 81, rod 82 and ribbons 85 to the pendulums 87. These, in the well known manner, now move outwardly and upwardly tending by their increasing moment to counterbalance the torque transmitted through the torque lever 74. This torque increases until it is greater than the mechanical strength of the cap 141 and the cap fractures. While the torque is increasing and the pendulums 87 move upwardly the rack 99, which is pivotally connected to the pendulums through the plates 95, partakes of the upward movement of these pendulums and with the cooperation of the pinion 100 turns the indicator 106 and its index 108 which at all times indicates the amount of this torque on the series of graduations 109 on the chart 110.

Since the "set" indicator 118 has the arm 124 riveted to it, which extends into the path of the indicator 106, the movement of this indicator is transmitted to the indicator 118 and this moves with it; however, immediately when the cap 141 fractures and no further torque is transmitted through the lever 74, the pendulums 87 due to gravity move downwardly, returning the indicator 106 to its zero position. The indicator 118 however remains in the position it occupies when the cap fractures since the small formed plate springs 122 riveted to it exert a slight frictional resistance thus holding it against movement. The operator may thus note the torque required to fracture the cap at his leisure and then return the indicator 118 to its zero position by turning the hand knob 123. It is, of course, obvious that when the cap fractures it is desirable that the operator open the motor circuit by pressing on the normally closed contact switch 145 thus de-energizing the circuit which feeds the motor 44.

Reference was previously made to means provided to prevent injury to the device when the cap 141 has such strength so as to resist a torque which is greater than the counterbalancing capacity of the pendulums 87; in that case, the pendulums 87 will move upwardly into their highest position and the indicator 106 will correspondingly move until it reaches the final full capacity graduation of the series 109. At this time the small magnet 126, fixed to the arm 127, will be in a position to attract the armature 128 of the mercury magnetic contact switch 125 and draw this out of engagement with the mercury globule 128' and thus breaking the motor circuit and de-energizing the motor before the pendulums 87 engage a bumper (not shown) in the interior of the housing 83.

It is also an object to determine the amount of torque which may be safely applied to the assembled bottle and cap by the capping spindle of the filling machine after the bottle is filled. The embodiment of this invention is well adapted for this determination. A face plate 159 (Fig. VIII) is threadedly mounted upon the end of the shaft 33 in place of the threaded fixture 137. A rubber disk 160 is fastened to this face plate by means of a collar 161 and a plurality of bolts 162. The rubber disk 160 is provided with a cored cavity 163 (Fig. IX) whose contour is such to completely and snugly engage the exterior of a bottle 164 and a cap 165 assembled to the bottle is gripped by the chuck 66 in the manner hereinbefore described and the device is operated until either the bottle 164 or the cap 165 fractures. From a series of these tests the safe capping torque may be determined.

The embodiments of the invention herein shown and described are to be regarded as illustrative only, and it is to be understood that the invention is susceptible to variation, modification and change within the spirit and scope of the subjoined claims.

Having described the invention, I claim:

1. In a device of the class described, in combination, a base, force counterbalancing mechanism and force indicating means fixedly mounted upon said base, said force counterbalancing mechanism including a force transmitting lever, a cylindrical shaft fixed in said lever and forming a fulcrum therefor, a chuck fixed on said fulcrum shaft, a second shaft mounted upon said base with its longitudinal axis in coincidence with the longitudinal axis of said cylindrical fulcrum shaft, a fixture secured to said second shaft, said chuck and said fixture cooperating to support an article to be tested, said second shaft being mounted for movement along its longitudinal axis, a relatively narrow faced gear mounted upon said second shaft, a motor, a gear operatively connected to said motor, said gear operatively connected to said motor being in meshing engagement with said gear on said second shaft and having a relatively wide face so that said second shaft may be shifted longitudinally and maintain such meshing engagement with said gear operatively connected to said motor, means for applying a predetermined end thrust to said second shaft, said end thrust applying means comprising a pivotally mounted arm, a poise movably mounted upon said arm, a knuckle mounted upon said arm and adapted to engage an end of said second shaft and means for supporting said pivotally mounted arm and knuckle out of engagement with said second shaft.

2. In a device of the class described, in combination, a base, force counterbalancing mechanism and force indicating means fixedly mounted upon said base, said force counterbalancing mechanism including a force transmitting lever, a cylindrical shaft fixed in said lever and forming a fulcrum therefor, a chuck fixed on said fulcrum shaft, a second shaft mounted upon said base with its longitudinal axis in coincidence with the longitudinal axis of said cylindrical fulcrum shaft, a fixture secured to said second shaft, said chuck and said fixture cooperating to support an article to be tested, said second shaft being mounted for movement along its longitudinal axis, a relatively narrow faced gear mounted upon said second shaft, a motor, a gear operatively connected to said motor, said gear operatively connected to said motor being in meshing engagement with said gear on said second shaft and having a relatively wide face so that said second shaft may be shifted longitudinally and its gear maintain such meshing engagement with said gear operatively connected to said motor, means for applying a predetermined end thrust to said second shaft, said end thrust applying means comprising a pivotally mounted arm, a poise movably mounted upon said arm and a knuckle mounted upon said arm and adapted to engage an end of said second shaft.

3. In a device of the class described, in combination, a base, force counterbalancing mechanism and force indicating means fixedly mounted upon said base, said force counterbalancing mechanism including a force transmitting lever, a cylindrical shaft fixed in said lever and forming a fulcrum therefor, a chuck fixed on said fulcrum shaft, a second shaft mounted upon said base with its longitudinal axis in coincidence with the longitudinal axis of said cylindrical fulcrum shaft and a fixture secured to said second shaft, said chuck and said fixture cooperating to support an article to be tested, said second shaft being mounted for movement along its longitudinal axis, a relatively narrow faced gear mounted upon said second shaft, a motor, a gear operatively connected to said motor, said gear operatively connected to said motor being in meshing engagament with said gear on said second shaft and having a relatively wide face so that said second shaft may be shifted longitudinally and its gear maintain such meshing engagement with said gear operatively connected to said motor and means for applying a predetermined end thrust to said second shaft.

4. In a device of the class described, in combination, a base, force counterbalancing mechanism and force indicating means fixedly mounted upon said base, said force counterbalancing mechanism including a force transmitting lever, a cylindrical shaft fixed in said lever and forming a fulcrum therefor, a chuck fixed on said fulcrum shaft, a second shaft mounted upon said base with its longitudinal axis in coincidence with the longitudinal axis of said cylindrical fulcrum shaft, a fixture secured to said second shaft, said chuck and said fixture cooperating to support an article to be tested, said second shaft being mounted for movement along its longitudinal axis, a relatively narrow faced gear mounted upon said second shaft, driving means and a gear operatively connected to said driving means, said gear operatively connected to said driving means being in meshing engagement with said gear on said second shaft and having a relatively wide face so that said second shaft may be shifted longitudinally and its gear maintain such meshing engagement with said gear operatively connected to said driving means.

5. In a device for testing molded receptacle closures, in combination, force generating means, force counterbalancing mechanism, force indicating means actuated by said force counterbalancing mechanism, means for transmitting force generated by said generating means to said force counterbalancing means through a receptacle closure being tested, said force generating means comprising an electric motor, a source of current, an electric circuit connecting said current source with said motor to energize the same, a normally closed switch in said circuit, said force indicating means comprising a relatively movable chart and indicator, said normally closed switch in said motor circuit being predeterminedly positioned in the path of movement of the movable member of said relatively movable chart and indicator and means secured to said movable member for opening said normally closed switch when said movable member reaches the predetermined position of said normally closed switch and de-energizing said motor.

6. In a device for testing molded receptacle closures, in combination, force generating means, force counterbalancing mechanism, force indicating means actuated by said force counterbalancing mechanism, means for transmitting force generated by said generating means to said force counterbalancing means through a receptacle closure being tested, said force generating means comprising an electric motor, a source of current, an electric circuit connecting said current source with said motor to energize the same, a normally closed magnetic switch in said circuit, said force indicating means comprising a relatively movable chart and indicator, said normally closed magnetic switch in said motor circuit being predeterminedly positioned in the path of movement of the movable member of said relatively movable chart and indicator and a magnet secured to said movable member for opening said normally closed magnetic switch when said movable member reaches the predetermined position of said normally closed magnetic switch and de-energizing said motor.

MARK A. WECKERLY.